United States Patent
Stolz

(10) Patent No.: US 6,591,585 B2
(45) Date of Patent: Jul. 15, 2003

(54) FORMING ROLLER AND A METHOD FOR PROCESSING FORMING ROLLERS

(75) Inventor: Leo Stolz, Ganterschwil (CH)

(73) Assignee: Swiss Caps AG, Kirchberg (CH)

( * ) Notice: Subject to any disclaimer, the term of this patent is extended or adjusted under 35 U.S.C. 154(b) by 0 days.

(21) Appl. No.: 09/851,251

(22) Filed: May 9, 2001

(65) Prior Publication Data

US 2001/0022066 A1 Sep. 20, 2001

Related U.S. Application Data

(63) Continuation of application No. 09/250,416, filed on Feb. 16, 1999.

(30) Foreign Application Priority Data

Feb. 17, 1998 (EP) .............................. 98810123

(51) Int. Cl.⁷ .............................................. B65B 47/00
(52) U.S. Cl. .............................. 53/454; 53/560; 53/900
(58) Field of Search .......................... 53/560, 561, 454, 53/900; 225/100; 451/75

(56) References Cited

U.S. PATENT DOCUMENTS 2,318,718 A * 5/1943 Scherer
5,647,524 A * 7/1997 Rautenberg

FOREIGN PATENT DOCUMENTS

WO wo96/31318 * 10/1996

* cited by examiner

*Primary Examiner*—Eugene Kim
(74) *Attorney, Agent, or Firm*—Shoemaker & Mattare

(57) ABSTRACT

A forming roller for manufacturing moulded bodies with the rotary die method comprises a surface which is roughened at least in the region of the forming roller webs. By way of the roughening of the forming roller webs the adhesive friction for the material tapes from which the moulded bodies are manufactured is increased. The roughness of the surface parts of the forming roller is advantageously produced by the processing of the surface with a blast means.

8 Claims, 4 Drawing Sheets

Figur 1
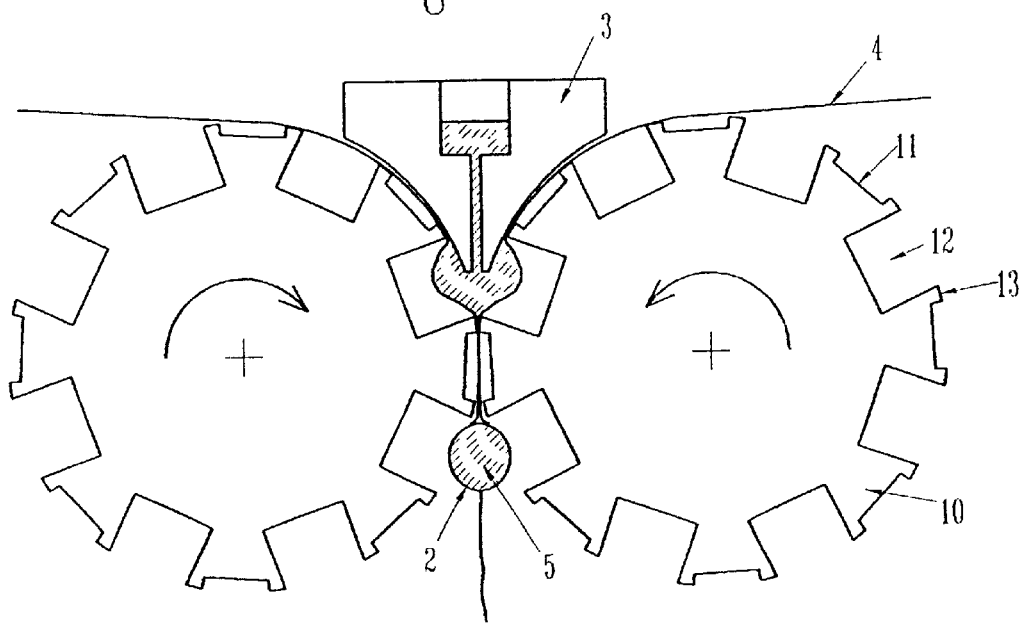
Figur 2
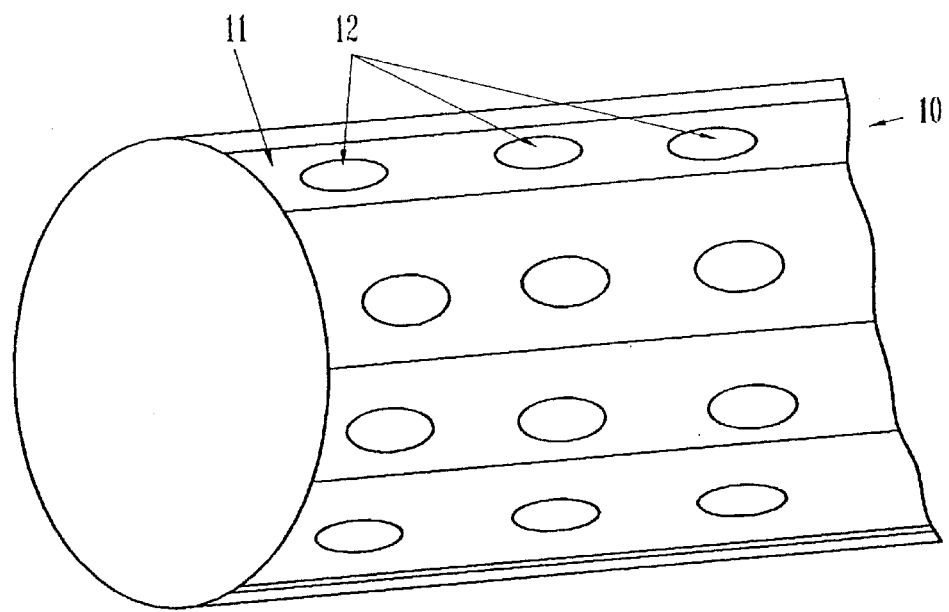

Figur 3a
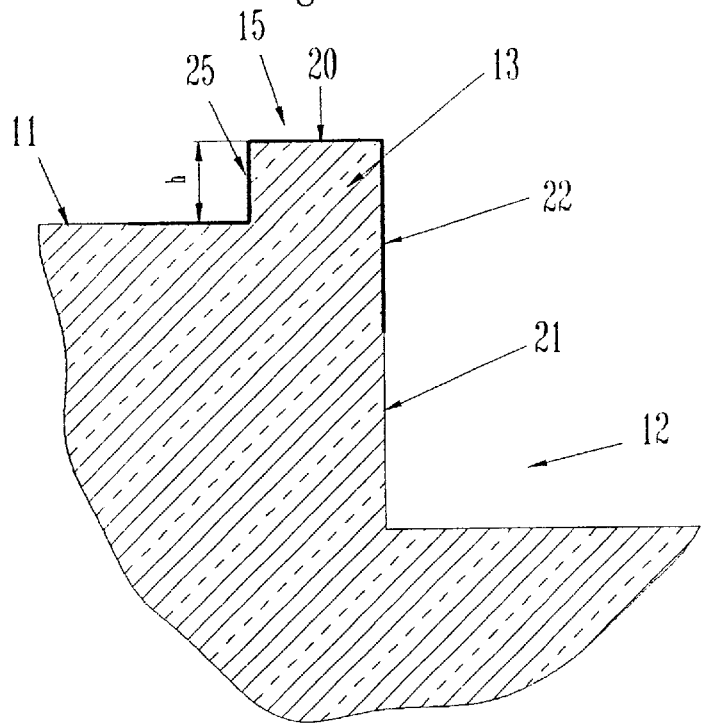
Figur 3 b
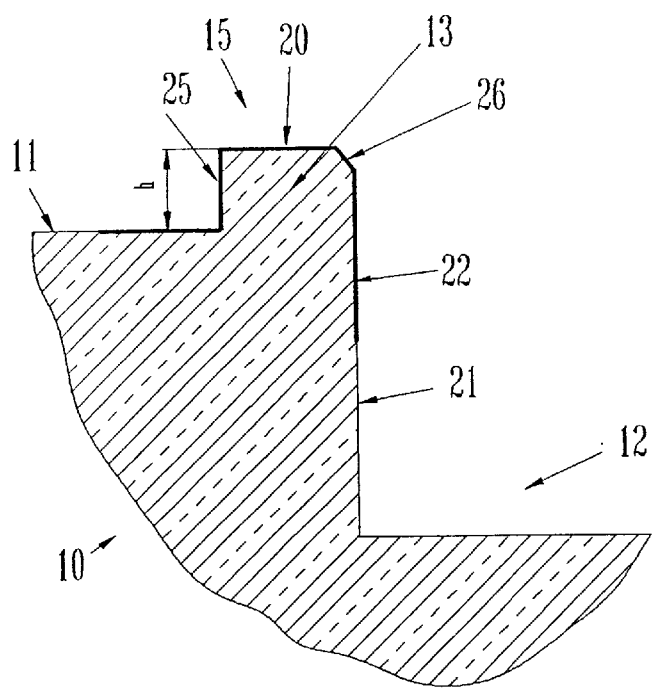

Figur 4
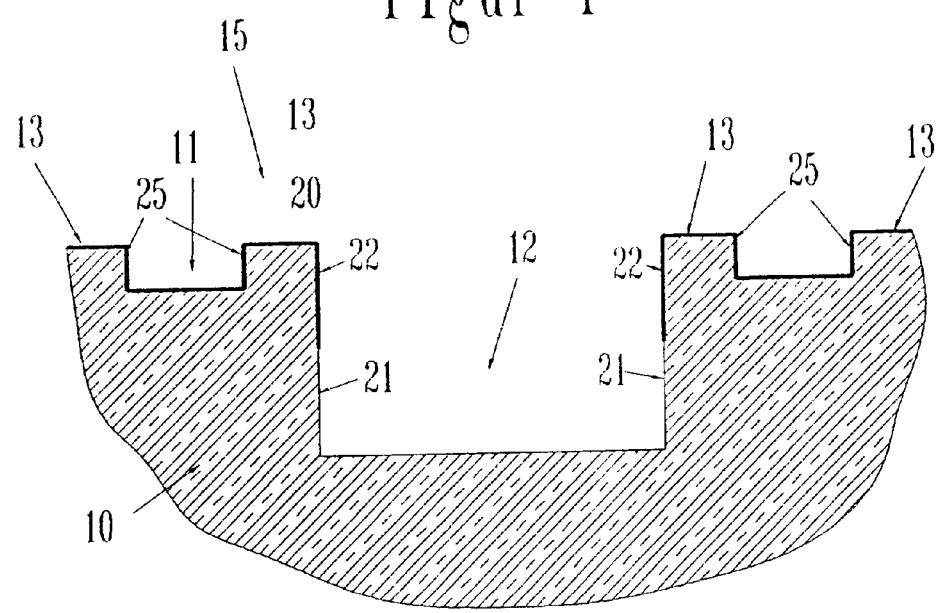
Figur 5
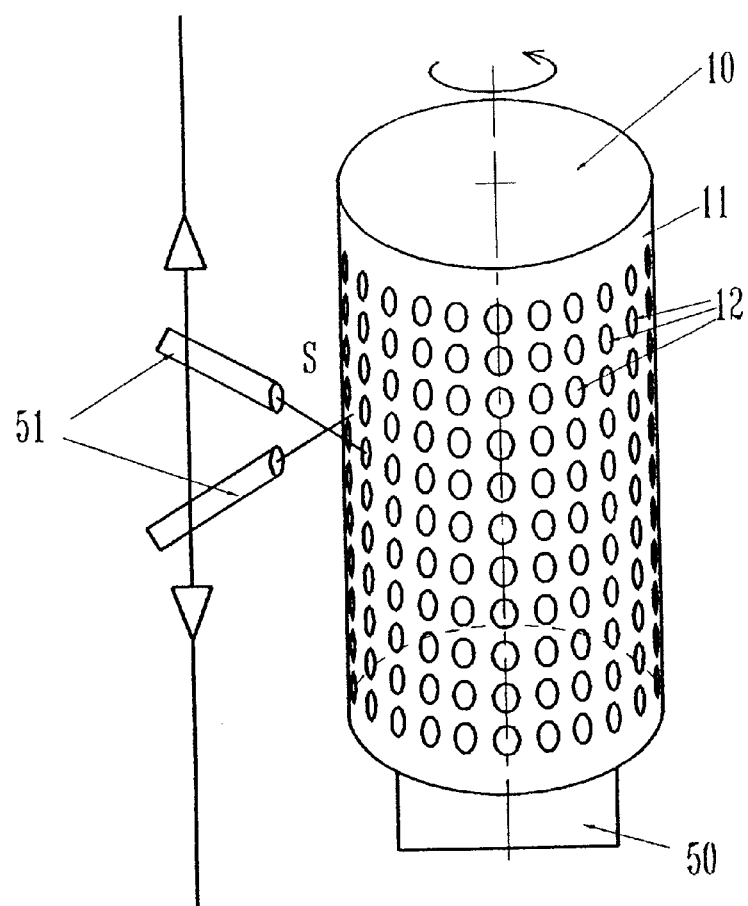

FORMING ROLLER AND A METHOD FOR PROCESSING FORMING ROLLERS

This application is a continuation of U.S. Ser. No. 09/250,416, filed on Feb. 16, 1999.

BACKGROUND OF THE INVENTION

The invention relates to a forming roller for a machine for manufacturing moulded bodies with the rotary-die method and a method for processing such forming rollers, with the features of the indroductory part of the independent patent claims.

For a long time it has been known to manufacture moulded bodies such as for example soft gelatine capsules with the so-called rotary-die method. Such a rotary-die method is for example described in EP 227 060.

With this method two tapes forming the raw material for the moulded body are guided through two counter rotating rollers. These forming rollers on their upper surface comprise deepenings which are bordered by webs. The two tapes are heated suitably until below the melting point and are welded to one another by the force effect of the webs. Simultaneouly by way of squeezing, the moulded bodies are separated out from the tapes. Before the welding with a so-called fill-wedge, a filling means may be locally injected between the two tapes. The filling means locally forces the tape regions into the reliefs of the forming rollers provided therefor, by which means the moulded bodies are formed, for example soft gelatine capsules.

The distance between the two forming rollers and the thickness of the material tapes to be connected determines essentially the force acting on the material tapes and thus the type and manner of the connection.

The pressure acting on the tape may not be selected infinitely large, since otherwise the edges of the moulded bodies to be manufactured are squeezed or destroyed. The pressure may however neither be selected infinitely small, since otherwise the two tapes are not sufficiently connected to one another.

Also when the pressure for connecting the two tapes is sufficient there are problems. On injecting the filling material between the two tapes the tapes are forced into the deepenings on the forming roller. With this there arises the danger that the material tape is not only stretched but also displaced beyond the webs towards the deepenings. This slip of the material tape leads to an irregular, in particular not rotationally symmetric banana-like shape of the manufactured moulded body (so-called bananas or "small boats"). It is not possible to prevent this slip by way of a higher pressing force of the two forming rollers, since with this the quality of the seam formation between the two tapes would be compromised.

BRIEF SUMMARY OF THE INVENTION

It is therefore the object of the present invention to prevent the disadvantages of that which is known, in particular to provide a forming roller which whilst retaining a high quality of the seam formation and a sufficient seam thickness, avoids the problem of the slip of the material tape.

Furthermore the forming roller is to be manufacturable as simply as possible and in an economical way and manner.

According to the invention these objects are achieved with a forming roller with the features of the latter parts of the independent patent claims.

In the following one forming roller is always referred to. It is clear that with a machine for manufacturing moulded bodies with the rotary-die method two counter rotating forming rollers are applied. The two forming rollers are formed mirror imaged in the same manner.

The forming roller according to the invention comprises a surface which is provided with a multitude of deepenings for receiving the moulded body to be manufactured. The moulded body is forced into these deepenings by injecting the filling material. Two tapes of raw material for manufacturing the moulded body are guided through between two counter rotating forming rollers.

The deepenings are surrounded by webs projecting beyond the surface of the forming roller. The webs press the two tapes, for example gelatine tapes, against one another and connect these each along a closed line.

For preventing slip of the material webs the surface of the forming roller in the region of the webs comprises at least one partly roughened surface. By way of the roughening of the surface, in particular on the web surface, the friction adhesion between the surface of the forming roller and the tapes is increased, by which mean the slip is reduced.

Here and in the following, roughened means that the surface in comparison to a surface of known forming rollers has a larger roughness. In particular roughened means a surface with a roughness with values $R_a$ larger than 1.0 μm.

Such a forming roller is furthermore also particularly economically manufacturable. By way of this the polishing of the surface of the forming roller necessary until know is done away with.

The web surface runs roughly parallel to the surface of the forming roller and is advantageously roughened over its whole surface. In the region of the web surface the material tape bears on the surface of the forming roller, by which means a particularly good improvement of the adhesion is achieved.

In an advantageous embodiment example also the outer surface of the webs, which is approximately perpendicular to the surface, may be roughend over its whole height. Further also the surface lying outside the webs may be roughened at least in a region neighboring the outer surface of the webs.

The deepening lying within the webs further comprises an inner wall which at least in an edge region connecting to the web surface runs roughly perpendicular to the surface and is roughened. With such a geometry the slip is additionally reduced.

For reasons of manufacturing technology under circumstances it is particularly simple when the whole surface is roughened. The whole surface in this context is to be understood as the surface of the webs and the surface lying between the webs. It is however not necessary to completely roughen the deepenings.

For example with pot-shaped deepenings the moulded body to be manufactured only comes into contact with the surface of the deepening in the edge regions lying neighboring to the web surface. The surface structure of the deepening in a lower region of the inner wall and in the floor region is therefore of a lesser importance with regard to the slip.

In a preferred embodiment example the webs further comprise an inner bevelling arranged between the web surface and the inner wall of the deepenings. The bevelling permits a more gentle stamping of the moulded bodies out of the two tapes connected to one another, by which means the quality of the seam formation may be improved. The bevelling does not need to be roughened.

The type and size of the roughness of the roughened surface regions of the forming roller in particular depends on the type of the applied material. It has been shown that with the manufacture of soft gelatine capsules with gelatine tapes, a roughened surface with an arithmetical means roughness value $R_a$ of 1.0 to 2.0 μm, preferably 1.4 to 1.7 μm is particularly advantageous. The roughened surface has additionally advantageously about 150 to 250 peaks/cm (Pc). Roughness characteristic dimensions here and in the following are specified according to DIN 4760-65.

The surface of a forming roller for a machine for manufacturing moulded bodies with the rotary-die method in a method according to the invention is subjected to a treatment by a granular blast means and with this is roughened. It is of course possible to apply other mean and methods for producing roughened surface structures. For the application of forming rollers in the manufacture of soft gelatine capsules it has been shown that a blast means with a granulation of 0.2 to 0.1 mm and with an approximately round shape or irregular break leads to a particular advantageous roughness. In particular corundum, glass or sand may be applied.

The surface of the forming roller may be particularly simply processed in that the forming roller is rotated on a rotating device at about five to ten rev/min. and at the same time impinged with a blast means. Advantageously the blast means is blasted from at least one injector nozzle against the surface of the forming roller, wherein the injector nozzle is moved parallel to the forming roller and runs up the whole roller surface.

In a further preferred embodiment example the blast means is blasted against the surface of the forming roller by way of two injector nozzles standing at an angle to each other.

BRIEF DESCRIPTION OF THE DRAWINGS

The invention is hereinafter described in more detail in embodiment examples and by way of the drawings. There are shown:

FIG. 1 a schematic representation of a machine for manufacturing moulded bodies with the rotary-die method, FIG. 2 a three dimensional representation of a cutout of a forming roller, FIGS. 3a and 3b an enlarged cutout of two different embodiment examples of a web in cross section, FIG. 4 a cutout with four mould webs in cross section, FIG. 5 a schematic representation of the method according to the invention for processing the surface of a forming roller, and FIG. 6 a roughness profile of a surface of a forming roller, roughened according to the invention.

DETAILED DESCRIPTION OF THE INVENTION

Figure 6:
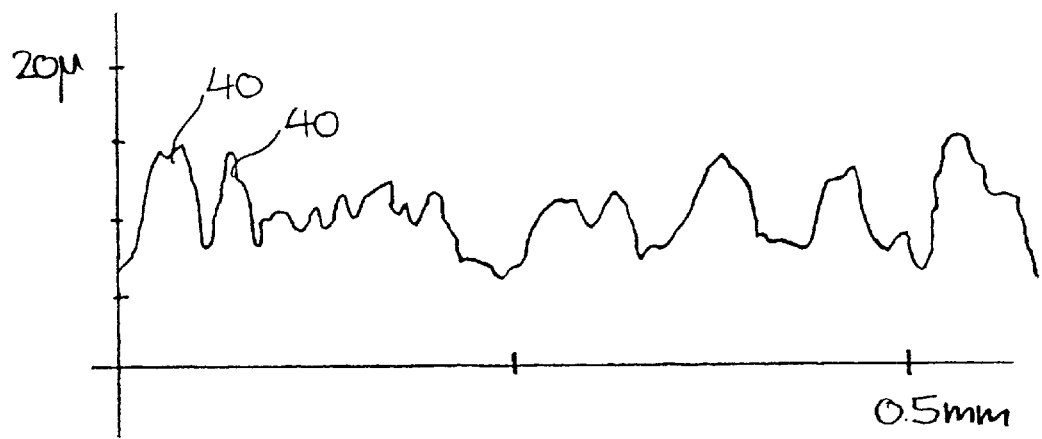

FIG. 1 shows schematically the functioning manner of a machine 1 for manufacturing moulded bodies 2, for example soft gelatine capsules with the rotary-die method. The machine 1 comprises two forming rollers 2 which rotate in opposite directions. Two material webs, for example gelatine tapes 4 are guided through between the two forming rollers 10. A fill wedge 3 permits the injection of a filling material 5 into the gap between the two gelatine tapes 4. The forming roller consists for example of steel, alloy, brass or cast brass with a Brinell hardness HB of 120–300. Advantageously this is in particular brass CuZnPb3, Permal 215 or 249.

The surface 11 of the forming rollers 10 is provided with deepenings 12. The deepenings 12 are bordered by webs 13 which protrude from the surface 11 of the forming rollers 10.

By way of injecting the filling material 5 the two tapes 4 are forced into the deepenings 12. By rotating the two forming rollers 10 the two tapes 4 approach one another and are pressed against one another by way of the effect of the webs 13. On account of this pressing on one another the two tapes 4 are connected to one another into moulded bodies along a multitude of closed lines and the moulded bodies 2 contained within these circular lines are cut out from the tape 4.

FIG. 2 shows schematically a cutout from the surface 11 of a forming roller 10. The surface comprises a multitude of deepenings 12.

FIG. 3a shows an enlarged cutout A of the surface 11 of the forming roller 10 according to FIG. 1. The deepening 12 in the surface 11 of the forming roller 10 is represented as a roughly cylinder-shaped pot. The shape of the deepening is however in the present case of a lesser importance. The deepening 12 is surrounded by a web 13 which projects from the surface 11 of the forming roller 10. In the embodiment example according to FIG. 3a the web surface 20 is roughened. The inner wall 21 of the deepening 12 is likewise roughened on an edge region 22 connecting to the web surface 20. The outer surface 25 of the webs 13, which runs approximately perpendicular to the surface 11, as well as a region 30 of the surface neighboring the outer surface 25 are likewise roughened. Essential to the invention is the fact that the surface in the region 15 of the webs is at least partly roughened. Of course not all regions which in FIG. 3a are shown as roughened need be roughened.

The height h of the webs beyond the coating surface in the shown embodiment example is 0.5–1.0 mm and the width of the webs 13 is 0.6–1.2 mm. The dimensions however depend above all on the purpose of application and on the size of the moulded body to be manufactured. A profile of the roughened surface is shown schematically in FIG. 6.

FIG. 3b differs from FIG. 3a only inasmuch as the webs 13 in the region 30 where the web surface 20 and the inner wall 21 of the deepening 12 meet one another, have an inner bevelling 26. This chamfering on the inner edge of the webs leads to a better seam formation and avoids the formation of shearing edges during the moulding of the capsule. In the embodiment example shown in FIG. 3b the width of the inner bevelling is 0.1 mm. The bevelling 20 does not need to be roughened.

During the moulding procedure the tape 4 shown in FIG. 1 in particular lies on the web surface 20 and the surface 11. It is therefore particularly important that at least these regions have a roughened surface.

FIG. 4 shows a somewhat larger cutout of the surface 11 of a forming roller 10. A deepening 12 is surrounded by a cicumferential web 13. The web 13 projects from the coating surface 11 of the forming roller 10. A multitude of individual deepenings 12 are arranged on the surface 11 of the forming roller 10. In the embodiment example according to FIG. 4 the whole surface 11 between the webs 13 is roughened. With the exception of the lower part of the inner wall 21 of the deepening 12 as well as the floor of the deepening 12 the whole surface 11 is roughened.

FIG. 5 shows schematically the method according to the invention for processing the surface of the surface 11 of a forming roller 10. The forming roller 10 is rotated about its own axis with a speed of 2–10 rev/min with a schematically represented rotation device 50. At the same time a blast means S is blasted from two injector nozzles 51 against the surface 11 of the forming roller 10. The two injector nozzles 51 are at an angle of 30–40° horizontally and 30–45° vertically to one another, by which means there results a particularly advantageous surface treatment. Horizontally and vertically here is with regard to the general vertical axis of the forming roller during the surface treatment procedure. Vertical means in a plane parallel to the axis of the forming roller and horizontal in a plane perpendicular to the forming roller. The two injector nozzles 51 are displaced with a speed of up to 15 cm/min parallel to the forming roller. As a blast means for example the corundum blast means biloxite No. 80 is applied.

FIG. 6 shows a profile through one of the roughened surface regions of the forming roller 10. The surface comprises a multitude of peaks 40 distanced to one another. The surface represented in FIG. 6 has found to be particularly advantageous in the manufacture of soft gelatine capsules. The roughness of the roughened surface is defined as follows in a concrete embodiment example (measuring apparatus Mitutoyo Surftest 301):

| | |
|---|---|
| $R_a$ | 1.17 μm |
| $R_y$ | 14.5 μm |
| $R_z$ | 12.6 μm |
| $R_p$ | 6.5 μm |
| $R_q$ | 2.3 μm |
| $R_t$ | 16.7 μm |
| $P_c$ | 173 cm |

$R_a$ indicates the arithmetical mean roughness value
$R_y$ indicates the maximum profile height
$R_z$ the determined roughness depth
$R_p$ the maximum profile summit height
$R_t$ the max. profile height per measuring path
$P_c$ the number of peaks per cm This surface was processed by a blast of the forming roller with the corundum blast means biloxite No. 80 (grain size 0.149 to 0.210 mm). The blasting of the forming roller was effected under the following conditions:
setting angle: 30° horizontally/30° vertically
time: 2×10 minutes
pressure: 3 bar According to the material tape to be processed various roughnesses have been found to be particularly favourable. The optimal roughness is determined specific to the case depending on the material for the moulded body.

It has been shown that in many cases the optimal roughness values lie in the following regions:

| | |
|---|---|
| $R_a$ | 1–2 μm |
| $R_y$ | 8–25 μm |
| $R_z$ | 7–16 μm |
| $R_p$ | 3–12 μm |
| $R_q$ | 1.8–3.5 μm |
| $R_t$ | 8–25 μm |
| $P_c$ | 150–250 cm |

Essential to the present invention is that the surface of the moulded body is at least partly roughened so that there results a better adhesive friction for the matrial tapes to be processed. The type of moulded body, the type of the filling of the moulded body and the applied material is of a minor importance for the subject-matter of the present invention.

What is claimed is:

1. A method for making capsules, said method comprising steps of guiding two material webs through a gap formed between two counter-rotating rollers, at least one of said rollers having a surface with a plurality of depressions formed therein and a plurality of ledges projecting from said surface, each of said depressions being surrounded by one of said ledges, injecting a metered filling material between said webs such that said filling material and said web are pressed into said depressions, welding said webs together around said filling material to form molded bodies containing said filling material, wherein each of said ledges has an arithmetical mean roughness, according to DIN 4760-65, of 1.0 μm to 2.0 μm, and 150 to 250 peaks per cm, to prevent the sheets from slipping between the rollers during injection of filler material.

2. A rotary die molding machine for forming capsules from two sheets of material, said machine comprising a pair of counter-rotating rollers between which said sheets are introduced, and means for injecting filler material between said sheets, each said roller comprising a surface having a plurality of depressions formed therein and a plurality of ledges projecting from said surface, each of said depressions being surrounded by one of said ledges, wherein each of said ledges has a surface having an arithmetical mean roughness, according to DIN 4760-65, of 1.0 μm to 2.0 μm, and 150 to 250 peaks per cm, to prevent the sheets from slipping between the rollers during injection of filler material.

3. A forming roller according to claim 2, wherein each of said ledges has a surface running parallel to the surface of said roller, the entire surface of said ledge having an arithmetical mean roughness, according to DIN 4760-65, of 1.0 μm to 2.0 μm, and 150 to 250 peaks per cm.

4. A forming roller according to claim 2, wherein the depression has an inner wall, said wall having an arithmetical mean roughness, according to DIN 4760-65, of 1.0 μm to 2.0 μm, and 150 to 250 peaks per cm at least in an edge region adjacent to said surface of said ledge.

5. A forming roller according to claim 2, wherein each said ledge has an exterior surface having an arithmetical mean roughness, according to DIN 4760-65, of 1.0 μm to 2.0 μm, and 150 to 250 peaks per cm.

6. A forming roller according to claim 2, wherein said surface of said roller, in a region adjacent said exterior surface of said ledges, has an arithmetical mean roughness, according to DIN 4760-65, of 1.0 μm to 2.0 μm, and 150 to 250 peaks per cm.

7. A forming roller according to claim 2, wherein the entire surface of said roller has an arithmetical mean roughness, according to DIN 4760-65, of 1.0 μm to 2.0 μm, and 150 to 250 peaks per cm.

8. A forming roller according to claim 2, wherein said ledges are beveled in a region between the ledge surface and the inner surface of the depression.

* * * * *